United States Patent Office 2,704,384
Patented Mar. 22, 1955

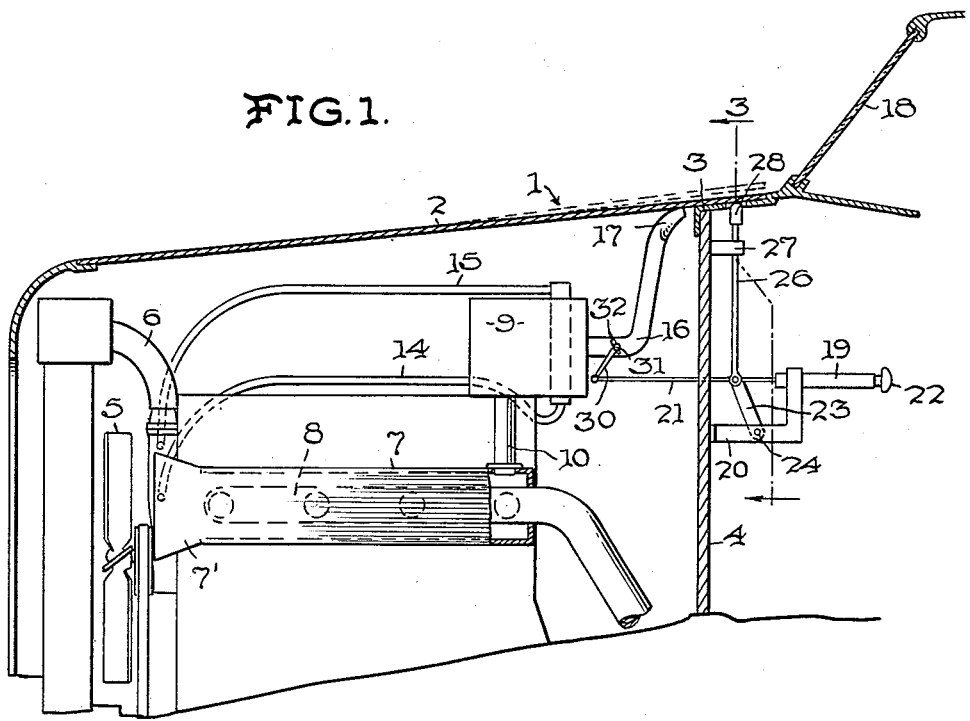
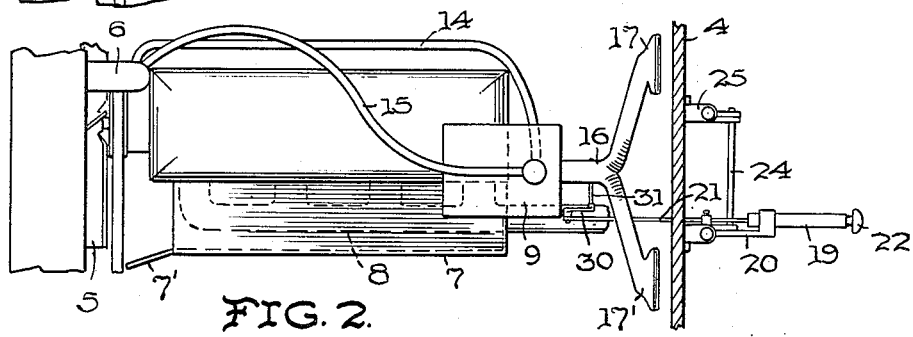
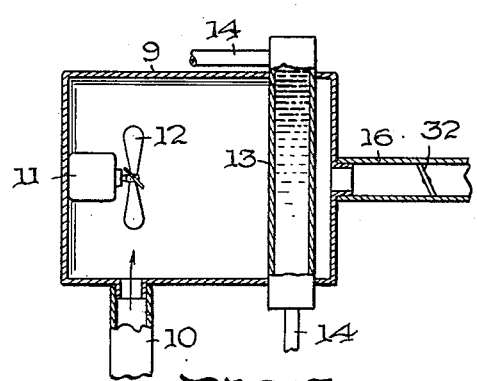

2,704,384

WINDSHIELD DEICER

Thomas W. Raish, Sr., Pueblo, Colo.

Application July 10, 1952, Serial No. 298,133

6 Claims. (Cl. 20—40.5)

This invention relates to apparatus for deicing the windshield of a motor vehicle, and particularly to apparatus for directing a stream of heated air against the outside of the windshield of a motor vehicle.

One of the perplexing problems in operation of a motor vehicle in cold weather has been avoidance of formation of a coating of ice or frost on the outer side of the windshield of the vehicle. Several different types of apparatus have been designed to overcome the problem, meeting with varying degrees of success. For instance, apparatus has been devised which directs a stream of heated air against the inner side of the vehicle windshield, but such apparatus has not been completely satisfactory since the glass windshield is not a good heat conductor, so that the outer side of the windshield is not heated rapidly, with the result that ice and frost on the outer side of the windshield melt rather slowly. Consequently, the operator must wait for some time after starting the vehicle engine before the ice and frost have cleared away sufficiently to enable him to see through the windshield.

In order to overcome the disadvantage of such apparatus, it has been proposed to raise the rear portion of the hood, that is, the portion adjacent and in front of the windshield, away from the cowl, so that air from within the engine compartment of the motor vehicle heated by contact with and radiation from the engine is directed against the outer side of the windshield. However, since most of the air within the engine compartment of a motor vehicle is fairly cold when the temperature of the surrounding air is very low, this latter-proposed heater has not met with complete success.

To obtain high-temperature air to be directed against the outer side of the windshield, it has been further proposed to pass an air stream through a confined passage about the exhaust manifold of the vehicle or about a radiator connected into the cooling system of the vehicle, but it has been found that the temperature of an air stream directed over only one of such heating means is not satisfactory for use in extremely bad weather conditions.

The present invention utilizes a combination of the last-mentioned proposals for heating the air stream, in combination with the proposal for directing the air stream against the outer side of the motor vehicle windshield, directly against the ice or frost which has formed thereon. Preferably, the air stream is preheated by passage over the exhaust manifold and is then heated to the higher temperature at which it is to be used by passage over a radiator connected into the engine cooling system. Use of the two heating means insures that the air stream will be sufficiently hot to melt ice and snow on the windshield.

After passage over the heating means, the air stream is directed through a conduit to one or more nozzles located in the engine compartment adjacent the rear portion of the hood and arranged to direct the air stream through the space formed between the rear portion of the hood and the cowl when the hood is raised by hood-raising mechanism and against the outer side of the windshield.

It is evident, of course, that such a heating apparatus for the motor vehicle windshield will not be necessary at all times, and that it will not be desirable that the hood be elevated with respect to the motor vehicle cowl when the heating apparatus is not in operation. Accordingly, the present invention utilizes apparatus operable to raise the rear portion of the hood above the cowl when defrosting is necessary and to return it to its normal position against the cowl when the use of the defroster is not necessary.

When the heating apparatus of the present invention is not in use, it is also desirable that the air stream not be conducted in its normal path toward the windshield, for, when the hood is in position against the cowl, the air stream would be operable only to heat the hood and cowl, and might well damage these parts of the motor vehicle. Accordingly, the present invention provides means for shutting off the stream of air when the heater or defroster is not being operated. In order that the operator of the motor vehicle may not forget to shut off the supply of hot air to the defroster when the hood is lowered against the cowl, or forget to lower the rear portion of the hood when the air stream is shut off, a common means for raising and lowering the rear portion of the hood and for controlling the supply of air to the defroster is connected to a single controller which projects into the operating compartment of the motor vehicle. By manipulating the controller, the operator selectively may simultaneously lift the hood with respect to the cowl and open the air stream conduit, and lower the hood against the cowl and shut off the supply of air.

The present invention will be described more fully in conjunction with the accompanying drawing showing a preferred embodiment of the invention.

In the drawing:

Fig. 1 is an elevational view, partly in section, of a portion of a motor vehicle with the apparatus of the present invention applied thereto;

Fig. 2 is a plan view of the apparatus shown in Fig. 1, with the vehicle hood removed;

Fig. 3 is a sectional view showing the radiator box of Figs. 1 and 2 and its connections; and Fig. 4 is a sectional view taken on line 4—4 of Fig. 1.

The deicer of the present invention is applied to a motor vehicle 1, having the usual hood 2, cowl 3, fire wall 4 separating the engine compartment from the operating compartment of the motor vehicle, fan 5, and the pipes 6 of the engine cooling system. The heater for the air to be used in defrosting comprises a heater box 7 positioned about the exhaust manifold 8 of the motor vehicle, with its front end open and positioned just rearward of the fan 5 to receive air therefrom. A vane or wing 7' mounted on the front end of the heater box directs air from the fan 5 into the heater box.

An auxiliary heater box or radiator box 9 is mounted above the rear end of the heater box 7 and has a pipe 10 connecting its interior to the interior of the rear end of the heater box 7 which surrounds the exhaust manifold. A motor 11, operated by any suitable means, but preferably by connection into the ignition system of the vehicle, drives a fan 12 positioned in the radiator box 9. The fan 12 is positioned near the upper end of the pipe 10 and directs the stream of air entering the radiator box through the pipe 10 against a radiator 13 connected by tubes 14 and 15 to the cooling system pipes 6 of the motor vehicle. The radiator 13 is positioned between the fan 12 and a conduit 16 which directs air from the radiator box 9 to a pair of nozzles 17 and 17' positioned adjacent the upper edge of the fire wall 4, beneath and just below the rear portion of the hood, that is, the portion adapted to lie against the cowl 3. The nozzles 17 and 17' are arranged to force air passing through them against the outer side of the windshield 18 through the space formed between the rear portion of the hood and the cowl when the hood-raising mechanism is operated, as hereinafter described.

A shield or bushing 19 is mounted on a bracket 20 fixed at its lower end to the fire wall 4 of the motor vehicle on the operating-compartment side of the fire wall. The shield 19 forms a journal for a control wire 21 which extends through the shield and the fire wall to adjacent the radiator box 9. The control wire 21 is provided with a handle 22 at its end in the operating compartment of the vehicle to permit movement of the control wire by occupants of the front seat of the vehicle. A link 23 is fixed at one end on a cross shaft 24 journaled for rotation between the bracket 20 and a second bracket 25, laterally spaced from bracket 20 and mounted on fire wall 4. The other end of link 23 is fixed to control wire 21, so that reciprocal movement of the control wire is translated through link 23 into rotational movement of cross shaft 24. A link 23' is fixed at one of its ends on the opposite end of shaft 24 from link 23. Operating rods or levers 26 and 26' have their lower ends attached to the upper ends of links 23 and 23', respectively, and are loosely fitted in brackets or journals 27 and 27' for sliding movement in response to pivotal movement of links 23 and 23'. The operating rods 26 and 26' carry at their upper ends a pair of hood-raising operators 28 and 28', respectively operable upon upward movement of rods 26 and 26' to raise the rear portion of the hood 2 away from the cowl 3.

A link 30 has one of its ends connected to the end of the control wire 21 opposite the handle 22 and has its other end fixed on a rotatable shaft 31. The shaft 31 carries at its other end a valve 32 mounted in the conduit 16 between the radiator box 9 and the nozzles 17 to allow opening and closing of the conduit.

In operation of the apparatus of the invention, when ice or frost forms on the outside of the windshield, the occupant of the motor vehicle grasps the handle 22 and pulls it toward him, causing the link 23 to swing in a clockwise direction, as viewed in Fig. 1, and rotate the cross rod 24 to swing the link 23' in the same direction. The clockwise rotation of the links 23 and 23' causes upward movement of the rods 26 and 26', thus causing hood operators 28 and 28' to raise the rear portion of the hood above the cowl to form a space between the hood and the cowl. At the same time, the link 30 rotates counterclockwise, causing corresponding movement of shaft 31 and valve 32. The valve thus moves to a position opening the conduit 16, so that air may pass therethrough. Air from the motor fan 5 is deflected by the vane 7' into the inner end of the heater box 7 from which it passes over the exhaust manifold 8 and is preheated by contact therewith and radiation therefrom. The preheated air then passes through the pipe 10 into the radiator box 9 and is forced by the fan 12 against the radiator 13 and is heated to a higher temperature by contact with and radiation from the radiator. Heated air from the radiator box 9 passes through the conduit 16 to the nozzles 17 and 17' which direct the air through the space between the hood and the cowl against the outer side of the windshield to heat it and remove any ice or frost therefrom.

When the deicer is no longer needed, the handle 22 and control wire 21 are pushed back toward the fire wall 4, thus causing swinging movement of links 23 and 23' in a counterclockwise direction. The control rods 26 and 26' then move downwardly causing the hood operators 28 and 28' to be retracted below the upper side of the cowl 3, so that the hood 2 can fall back by gravity against the cowl. At the same time, the link 30 swings in a clockwise direction, causing clockwise movement of valve 32 to a position blocking the conduit 16, so that no air can flow to the nozzles 17.

It is obvious that many changes can be made in the specific apparatus herein disclosed, without departing from the spirit of the invention. Accordingly, the invention is not to be considered limited to the apparatus specifically described herein, but only by the scope of the appended claims.

I claim:

1. Deicing apparatus for a motor vehicle having an engine compartment, a hood, a cowl and a windshield, comprising means operable to raise the rear portion of the hood adjacent the cowl and in front of the windshield upwardly with respect to the cowl to form a space between the hood and the cowl, nozzle means mounted in the engine compartment adjacent said rear portion of the hood and arranged to direct air supplied to said nozzle means through said space against the outer side of the windshield, means including a conduit for conducting air from within the engine compartment to the nozzle means, said conduit being connected at one end to the nozzle means, a valve in said conduit operable to open and close the conduit for the passage of air therethrough and a single controller connected both to said hood-raising means and to said valve and operable simultaneously to move said valve and said hood-raising means.

2. Deicing apparatus as defined in claim 1 in which said single controller comprises a reciprocable wire operably connected to said valve and to said hood-raising means, said wire projecting into the operating compartment of the motor vehicle, whereby an occupant of the motor vehicle may control the valve and the hood-raising means.

3. Deicing apparatus for a motor vehicle having an engine compartment, an exhaust manifold, a hood, a cowl and a windshield, comprising means operable to raise the rear portion of the hood adjacent and in front of the windshield upwardly with respect to the cowl to form a space between the hood and the cowl, nozzle means mounted in the engine compartment adjacent said rear portion of the hood and arranged to direct air supplied to said nozzle means through said space against the outer side of the windshield, a heater box mounted about the exhaust manifold and having its end at the front of the manifold open to the air, means including a conduit for conducting air from the rear end of the heater box to said nozzle means, whereby, when said motor vehicle is operating, air forced into said heater box by the forward movement of the motor vehicle is heated by passage over the exhaust manifold, a valve in said conduit operable to open and close the conduit for the passage of air therethrough, and a single controller operably connected both to said hood-raising means and to said valve and operable simultaneously to move said valve and said hood-raising means.

4. Deicing apparatus as defined in claim 3 in which the motor vehicle has a fan, and a vane is mounted on the inlet end of said heater box in a position to direct air currents from the fan into the heater box.

5. Deicing apparatus as defined in claim 3 in which said motor vehicle has a cooling system, a radiator box mounted beneath the hood, a radiator mounted in the radiator box, means connecting said radiator with said cooling system so that hot water from the cooling system is circulated through the radiator, means connecting the rear end of the heater box to the radiator box, and means connecting the radiator box to said conduit, said radiator being mounted between said two last-mentioned connecting means, whereby, when said controller is operated, air is preheated by passage over the exhaust manifold, heated by passage over said radiator, and directed against the outer side of the windshield.

6. Deicing apparatus as defined in claim 3 in which said single controller comprises a reciprocable wire operably connected to said valve and to said hood-raising means, said wire projecting into the operating compartment of the motor vehicle, whereby an occupant of the motor vehicle may control the valve and the hood-raising means.

References Cited in the file of this patent

UNITED STATES PATENTS

| Number | Name | Date |
|---|---|---|
| 1,790,419 | Heinemann et al. | Jan. 27, 1931 |
| 1,851,619 | Deal | Mar. 29, 1932 |
| 2,051,571 | Paton | Aug. 18, 1936 |
| 2,054,948 | Robinson | Sept. 22, 1936 |
| 2,187,281 | Pagliaroni | Jan. 16, 1940 |